United States Patent
Gupta

(10) Patent No.: US 10,380,106 B2
(45) Date of Patent: Aug. 13, 2019

(54) EFFICIENT METHOD AND HARDWARE IMPLEMENTATION FOR NEAREST NEIGHBOR SEARCH

(71) Applicant: Intel Corporation, Santa Clara, CA (US)

(72) Inventor: Niraj Gupta, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 974 days.

(21) Appl. No.: 14/564,151

(22) Filed: Dec. 9, 2014

(65) Prior Publication Data
US 2015/0186458 A1 Jul. 2, 2015

(30) Foreign Application Priority Data
Dec. 26, 2013 (IN) .......................... 6089/CHE/2013

(51) Int. Cl.
G06F 16/245 (2019.01)
G06K 9/62 (2006.01)
G06F 16/903 (2019.01)

(52) U.S. Cl.
CPC ...... *G06F 16/245* (2019.01); *G06F 16/90335* (2019.01); *G06K 9/6261* (2013.01)

(58) Field of Classification Search
None
See application file for complete search history.

(56) References Cited

U.S. PATENT DOCUMENTS

| | | |
|---|---|---|
| 2003/0187616 A1 | 10/2003 | Palmadesso et al. |
| 2010/0014577 A1 | 1/2010 | Vasilache et al. |
| 2010/0092093 A1 | 4/2010 | Akatsuka et al. |
| 2010/0262633 A1* | 10/2010 | Bhattacharjee ... G06F 17/30312 707/812 |
| 2010/0332210 A1 | 12/2010 | Birdwell et al. |
| 2013/0251269 A1 | 9/2013 | Chehaiber |

OTHER PUBLICATIONS

International Search Report and Written Opinion for International Patent Application No. PCT/US2014/065872, dated Feb. 27, 2015, 10 pages.
International Preliminary Report on Patentability for International Patent Application No. PCT/US2014/065872, dated Jul. 7, 2016, 7 pages.

* cited by examiner

*Primary Examiner* — Amresh Singh
(74) *Attorney, Agent, or Firm* — Jordan IP Law, LLC

(57) ABSTRACT

Systems and methods may provide feature matching in object-recognition applications. The systems and methods may determine various features of an object and determine what type of object to which the features correspond. The systems and methods may also detect objects within a database and extract vectors based on unique features of the objects. The extracted vectors may be stored in a memory such as a buffer. The extracted vectors may be used to match against a database of objects of interest or test vectors. Features within the objects may then be quickly and efficiently determined based on the best matches between the extracted vectors and the test vectors, thereby determining suitable best matches while avoiding the necessity to search the full database.

19 Claims, 9 Drawing Sheets

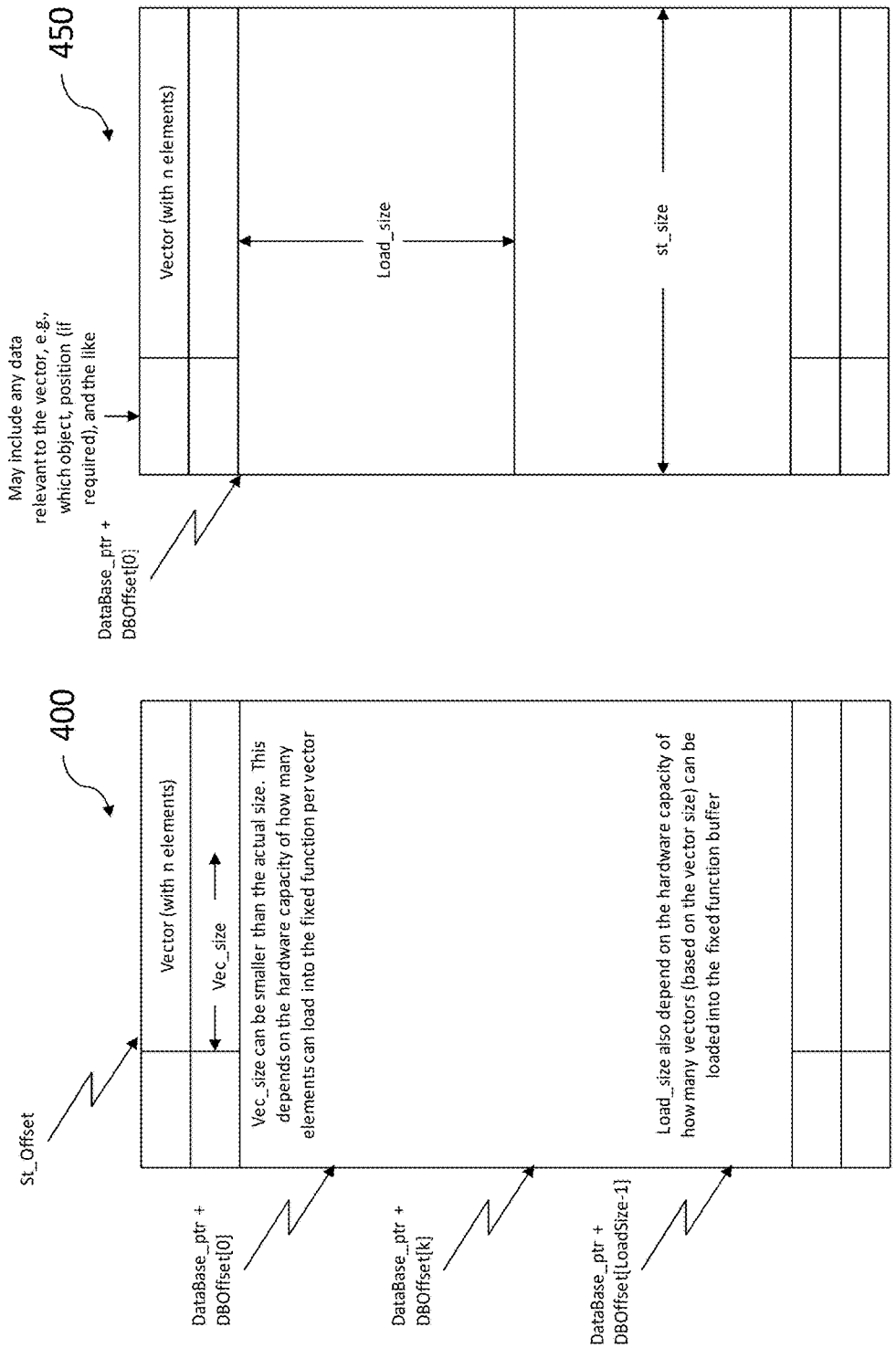

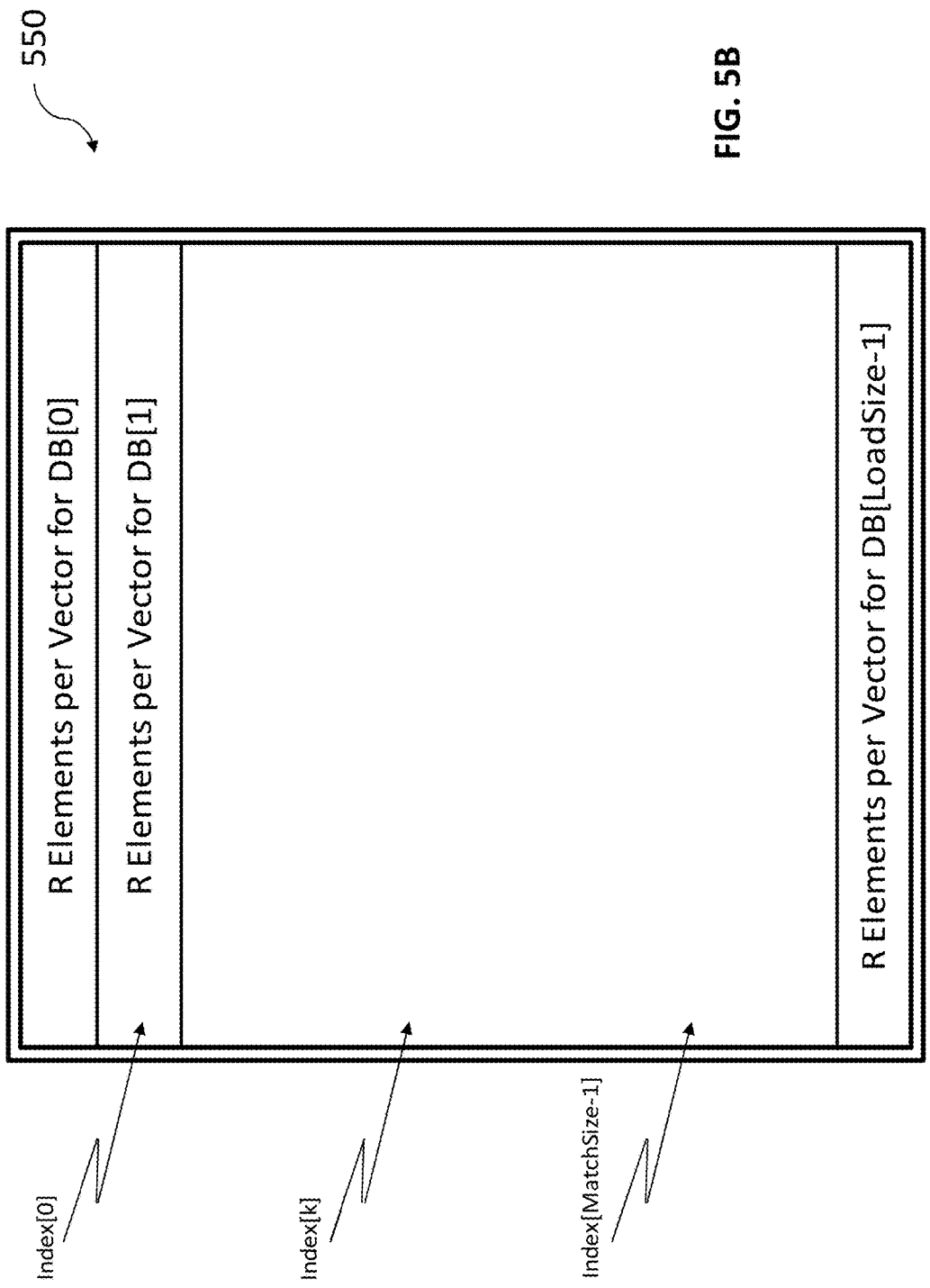

EFFICIENT METHOD AND HARDWARE IMPLEMENTATION FOR NEAREST NEIGHBOR SEARCH

BACKGROUND

Certain computing applications may utilize feature matching techniques in order to perform various computer workloads such as object recognition, face recognition, and the like. These feature matching or Nearest Neighbor Search (NNS) applications may use various algorithms including for example, KD (k-dimensional) Tree, Hierarchal K-Means, Locality Sensitive Search (LSS), and the like, for performing the search. Brute force matching may be widely used and may require that the data extracted from the image be matched against an entire database in order to find the best match. Hierarchical matching may require that training be first performed on the database in order to establish a hierarchy based on different known clustering methods. The database can either be arranged according to the hierarchy or an index can be arranged in a hierarchy where the index entries point to a corresponding database entry. The database is arranged in this fashion prior to performing matching. The system may then be allowed to perform the matching based on the hierarchy of considerations. These techniques, however, provide software solutions that may have significant limitations and drawbacks. For example, most known solutions may only work with some form of brute force object matching, which typically cannot run in real-time on large databases (and may therefore prohibit their use in mobile applications). Other known solutions may also require relatively high power, which further limits their use.

BRIEF DESCRIPTION OF THE DRAWINGS

The various novel aspects of the embodiments of the present disclosure will become evident to a person of ordinary skill in the art given the following enabling specification and appended claims, and by referencing the following drawings, in which:

FIGS. 4A and 4B are illustrations of examples of arrangements of databases in accordance with embodiments of the present disclosure;

FIGS. 5A and 5B are illustrations of examples of arrangements of database storage in a buffer in accordance with embodiments of the present disclosure;

DETAILED DESCRIPTION OF THE DRAWINGS

Figure 1:
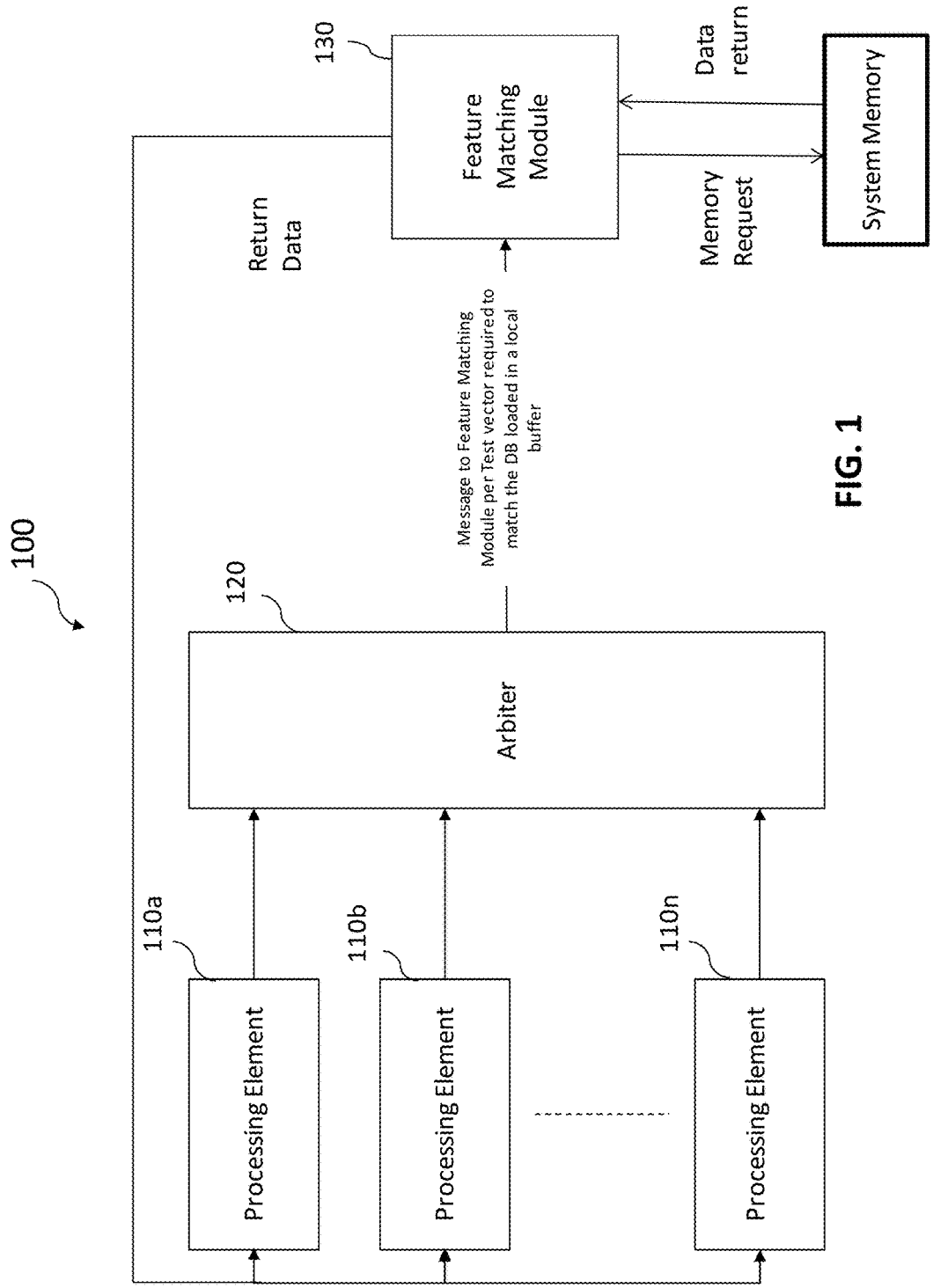
FIGS. 1-3 are block diagrams of examples of feature matching systems in accordance with embodiments of the present disclosure.

FIG. 1 shows a block diagram of an example of a feature matching system 100 (also referred to as "hardware accelerator"), in accordance with an embodiment of the present disclosure. The hardware accelerator 100 may generally be part of a computing platform such as, for example, a smart phone, smart tablet, mobile Internet device (MID), smart television (TV), media player, notebook computer, desktop computer, server, and the like. The illustrated hardware accelerator 100 includes one or more processing elements 110*a*-110*n*, an arbiter 120, and a feature matching module 130. The one or more processing elements 110*a*-110*n* may be coupled to the feature matching module 130 via the arbiter 120. The processing elements 110*a*-110*n* may include, for example, a central processing unit (CPU, host processor), a graphics processing unit (GPU), an advanced processing unit (APU) such as a general purpose graphics processing unit (GPGPU), and the like. The arbiter 120 may be, for example, an asynchronous arbiter that is capable of receiving requests from multiple processing elements 110*a*-110*n* and ordering the requests in order to determine the order of access to the feature matching module 130.

The feature matching module 130 may be fixed function hardware and can be coupled to the processing elements 110*a*-110*n* via memory mapping or via direct connection. For example, the feature matching block 130 can be coupled to CPUs via memory mapping and coupled to GPU processing elements via direct connection. These examples, however, have been provided only for illustration. The illustrated feature matching module 130 is not limited to these means of connection to the processing elements 110*a*-110*n*. Further, multiple matching modules 130 may be connected to multiple CPUs, GPUs, or other processing elements without departing from the disclosure.

The feature matching module 130 may define an interface that provides the hardware accelerator 100 with the flexibility to be used across multiple feature matching applications, i.e. algorithms (thereby eliminating the reliance of use with one application, e.g., brute force matching). The feature matching module 130 also provides the hardware accelerator 100 with the flexibility to load both continuous locations of a database and scattered pointers to the database. The use of both contiguous and scattered database searches avoids the necessity of rearranging the database at each step so that data is in contiguous locations in order to be useful by the hardware. The illustrated hardware accelerator 100 thereby avoids the large number of copies of the database and improves system performance.

The hardware accelerator 100 may include an application programming interface (API) stored in memory. An API call may cause the processing elements 110*a*-110*n* to issue test vectors. When the databases to be loaded are the same, the hardware accelerator 100 may recognize the states to be the same and optimize for the fetch of the database vectors across test vectors, which may use the same database vectors for matching. In a multi-core or multi-processing element embodiment, each processing element/core could simultaneously work on different test vectors. As a result, the hardware may receive requests from all the processing elements/cores and would need to reorder and optimize the fetch of the database across these requests from many cores/processing elements. Discussed in more detail below, the API may be used to optimize the fetches of the database vectors to maximize the utilization of fetches. The API may require some barrier and ordering to avoid fetching the same database vectors for matching when moving from one test vector matching to the next when using the same database vectors.

Figure 2:
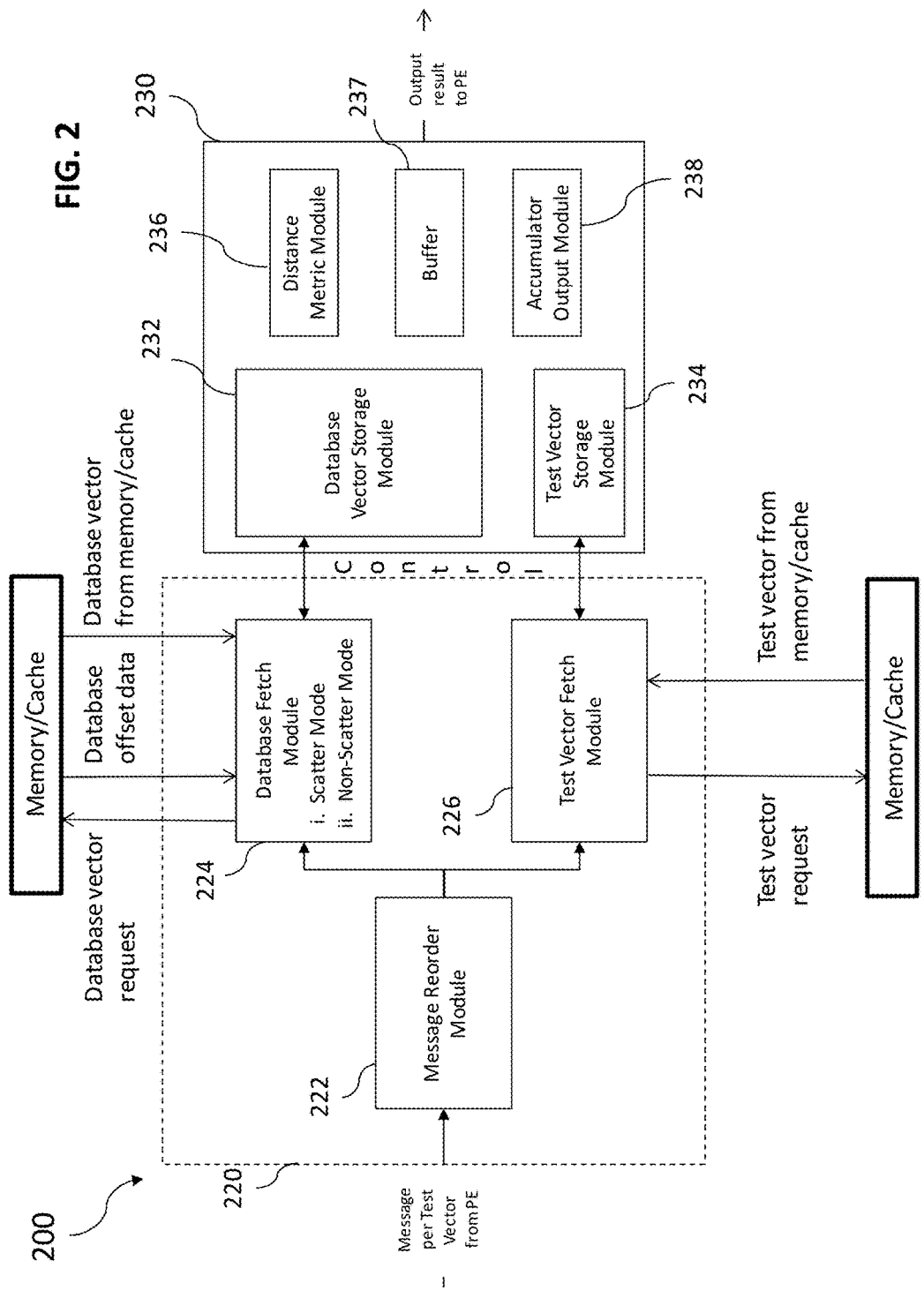

FIG. 2 shows an embodiment of a feature matching system 200 (also referred to as "hardware accelerator") in accordance with the present disclosure. The illustrated hardware accelerator 200 details the components of hardware accelerator 100 including arbiter 120 and feature matching module 130, discussed above with respect to FIG. 1. The hardware accelerator 200 may include an arbiter 220 coupled to a feature matching module 230. The illustrated arbiter 220 includes a message reorder module 222, a database fetch module 224, and a test vector fetch module 226. The feature matching module 230 may include a database vector memory/storage module 232, a test vector memory/storage module 234, a distance metric 236, a buffer 237, and an accumulator module 238. The arbiter 220 may receive requests, i.e., messages, from one or more processing elements (not shown), wherein the requests may seek access to the feature matching module 230.

The illustrated message reorder module 222 of the arbiter 220 reorders or prioritizes the requests to optimize the database fetch across test vectors using the same database vectors for matching. In order to accomplish the prioritization, the test vectors may be submitted to a database vector fetch module 224 and a test vector fetch module 226. The database vector fetch module 224 may utilize scattering and non-scattering modes to read vectors from the database vector storage module 232. The scatter mode may use a database offset (DBoffset), wherein the non-scatter mode may compute the next database offset (DBoffset) by incrementing a pointer starting from DBoffset[0]. In scattered mode, the database offsets can be stored in an index table which may be used to indirectly address into the database and read different addresses. The database offsets may be stored in consecutive locations in the index table. The test vector fetch module 226 may read vectors from the test vector storage module 234.

The feature matching module 230 may utilize the distance metric module 236 to determine matches between database vectors which may be stored, for example, in database vector storage module 232 and test vectors stored in test vector storage module 234. The distance metric module 236 may enable feature matching based on a variety of distance parameters including, for example, L1 norm, L2 norm, and hamming distance. L1 norm may be the sum of absolute distances (SAD), L2 norm may be the sum of the square of distances (SSD), and hamming distance (HD) may be the sum of all bits which are different between the test vector and the database vector. The accumulator and output module 238 may accumulate the results of the matching and outputs the results to the processing elements.

The messages/commands received by the message reorder module 222, may also include additional information to read the vectors including, for example, whether the load is stored at contiguous locations or scattered locations, programmed database pointers, the size of the structure per database entry, the offset of the vector to be loaded within the structure, and the like. The database fetch unit 224 may make memory requests directly to memory or cache for the database in contiguous mode. In scattered mode, the database fetch unit 224 may make requests to fetch the database offsets from the index table stored in memory. The database fetch unit 224 may then receive the database offsets and fetch the database from the memory/cache.

Figure 3:
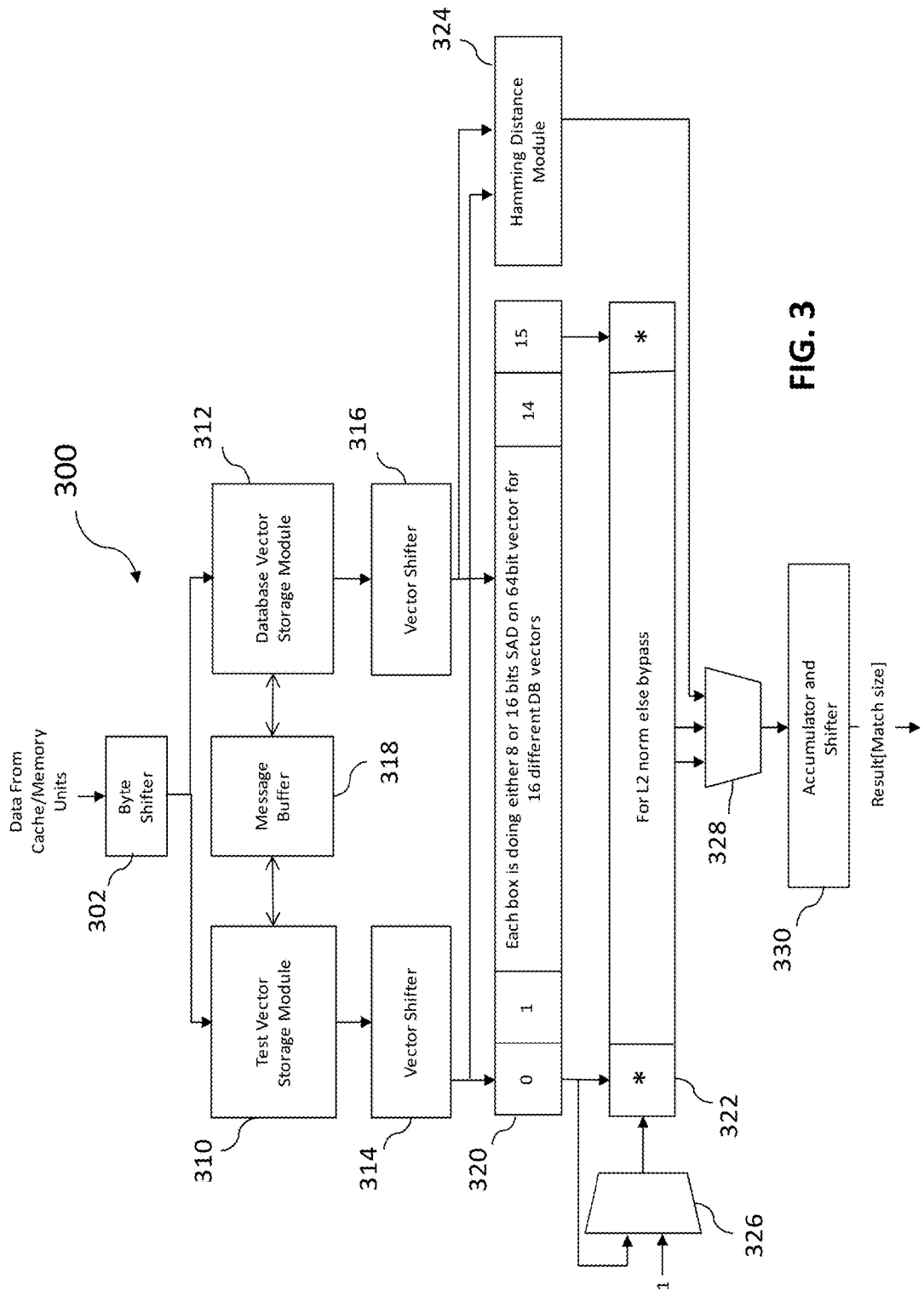

FIG. 3 shows an example of an embodiment of a feature matching module 300 in accordance with the disclosure. The illustrated feature matching module 300 includes a byte shifter 302, a test vector storage module 310, a database vector storage module 312, a vector shifter 314, a vector shifter 316, a message buffer 318, a distance metric module 320, a distance metric module 322, a hamming distance module 324, a multiplexer 326, a multiplexer 328, and an accumulator and shifter module 330. In at least some embodiments, each of the distance metric module 320, distance metric module 322, hamming distance module 324, multiplexer 326, multiplexer 328, and accumulator and shifter 330 may include an array of multiple modules. The byte shifter 302 may receive data from memory/cache initiated by the messages from the database fetch module, e.g., database fetch module 224, for the database, to load a specified number of vectors, i.e., a "loadsize", into the database vector storage module 312. Byte shifter 302 may also receive data from memory/cache initiated by the test vector fetch unit, e.g., test vector fetch module 226, for the test vector and stored into the test vector storage module 310. The messages received by the byte shifter 302 may also include additional information required to read the vectors including a prioritization or ranking of the messages to access a vector database stored in the database vector storage module 312. The illustrated byte shifter 302 outputs the data to the appropriate vector storage module 310, 312. The vector storage modules 310, 312 may be coupled to the message buffer 318 and to respective vector shifters 314, 316. The vector shifters 314, 316 may be coupled to a distance module 320 (for L1 norm distance calculation), distance module 322 (for L2 norm distance calculation), and a hamming distance module 324 (for a hamming distance calculation).

The illustrated memory 320 defines a first distance metric L1 norm and includes 16 different sum of absolute distances (SAD) calculation module to calculate the L1 norm distance between database vector and test vector with each element size in the vector being either 8 or 16 bits. The first distance metric, i.e., distance module 320, corresponds to a first distance mode, e.g., L1 norm mode, and determines a sum of absolute distances (SAD). Distance module 320 provides an output of the SAD to distance module 322 and to an input of a multiplexer 326 containing an array of multiplexers, e.g., 2:1 multiplexers. Distance module 322 defines a second distance metric and also includes 16 different memory locations each having 8 or 16 bits. The second distance metric, i.e., distance module 322, corresponds to a second distance mode, e.g., L2 norm mode, and determines a sum of square of distances (SSD). When in L2 norm or SSD mode, module 322 receives inputs from SAD distance module 320 and multiplexer 326 in order to determine the SSD. When in L1 norm or SAD mode, however, module 322 passes (bypasses) the inputs to multiplexer 328. The hamming distance module 324 may define a hamming distance metric and output a sum hamming distance of all bits output by the vector shifters 314, 316. The illustrated output of hamming distance module 324 provides an input to multiplexer 328. Multiplexer 328 may be, e.g., a 3:1 multiplexer, that provides an output based on an appropriate distance metric, e.g., SAD, SSD, or HD, to accumulator/shifter 330. An accumulator/shifter 330 may accumulate the results of the distance metric for the vector size and output the result. A sort engine may be optionally added to accumulator/shifter 330 to sort the output after the final result to find the best "N" match vectors of the vectors matched. Optionally, the results may be sent directly to the processing elements and the sort may be performed in the processing unit across the database vectors from different messages for a particular test vector.

FIGS. 4A and 4B show examples of arrangements of databases in accordance with embodiments of the present disclosure. FIGS. 4A and 4B show arrangements of vector databases 400, 450 and provides examples of various parameters that may be used by the API, discussed below. The various parameters include but are not limited to, for example, loadsize, vector, vector size, structure size per database entry, vector offset, database pointer, database offset, and the like. These parameters are discussed more thoroughly below. The vector may be primarily stored, e.g., in linear memory, in the form of a structured buffer within vector databases 400, 450. FIG. 4A illustrates a vector database 400 and provides an example of a scattered read of the database. For example, different database offsets are used to read the database vector from different locations. The database offsets may be typically stored in an index table prepared during training. The database offset may be arranged such that the index may be read in consecutive locations and the database offsets used to point to different locations into the database. FIG. 4B illustrates a vector database 450 and provides an example of a database read from a starting location as indicated by DBoffset[0]. Consecutive locations and the number of vectors to be read may be indicated by the loadsize. The size of the vector to be read for each database vector may be indicated by the vec_size. The st_size indicates the size of each structure that represents the database vector.

Figure 5A:
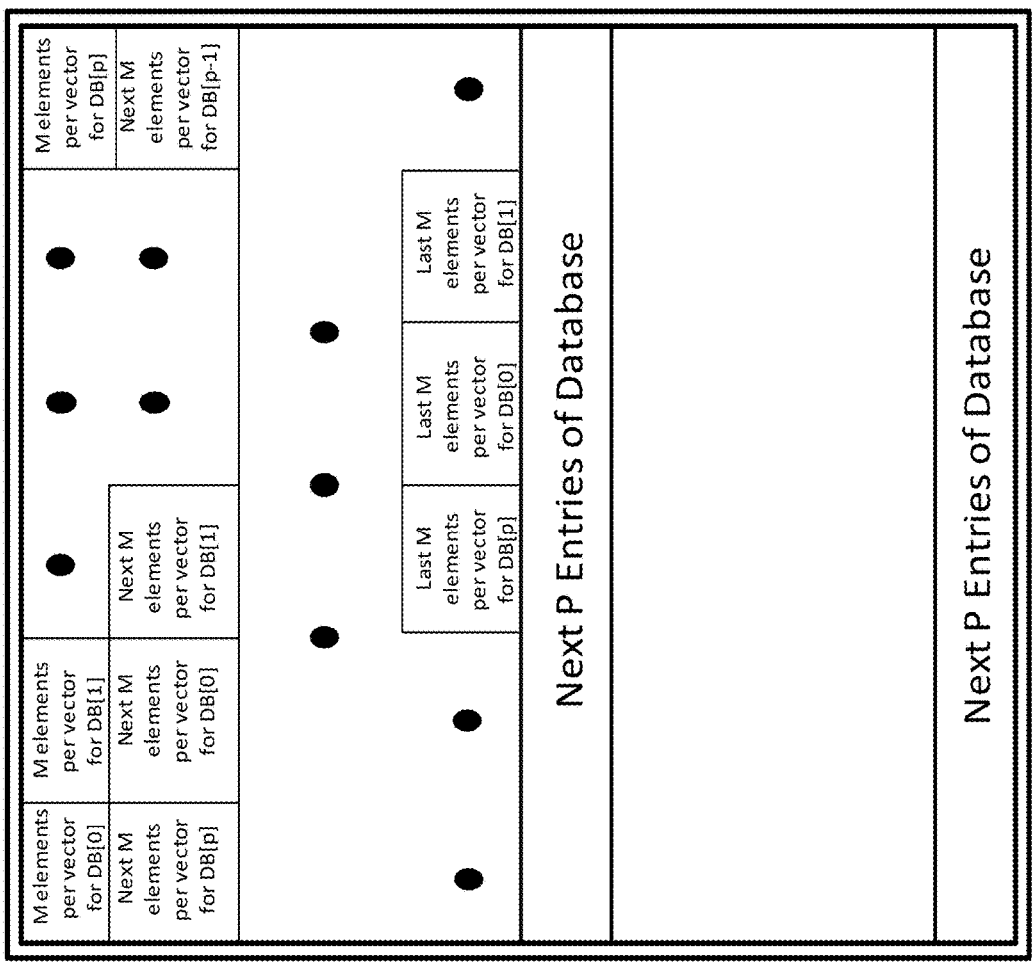

FIGS. 5A and 5B show examples of arrangements of database storage in a buffer in accordance with embodiments of the present disclosure. FIG. 5A shows a database storage 500 in a local buffer, e.g., buffer 232, in the feature matching module 230 if a local index into the buffer is not used. FIG. 5B shows a database storage 550 in a local buffer, e.g., buffer 232, in the feature matching module 230 if a local index into the buffer is used. The local buffers or storage may be, for example, RAMs with a single read/write port in order to be area efficient. Each column in the storage may be independent RAM with independent read/write control. Hence, when the local buffer is to be accessed by not using the local index mode, where the database vector is to be read out from consecutive locations, multiple database vectors may be stored in independent columns with M-elements. This arrangement allows elements to be read in parallel (depending on the number of columns) and compared with the test vector. When the local index is used to read the database vector, the locations which are read from the database storage, e.g., database vector storage module 232, are not contiguous and storing the locations in columns may be less helpful. To provide more utility for scattered locations, each database vector may be stored in each row across the columns, as shown, e.g., in FIG. 5B. The size and number of vectors which can be stored in the RAM will depend on the width and height of the RAM and on how the RAM is split.

The following provides an application programming interface (API) that is suitable for use with the disclosure herein. The API provides access to the hardware accelerator 100, 200, as follows:

```
FeatureMatching (
    SurfaceIndex *DB_ptr, //Database Base pointer
    SurfaceIndex *TV_ptr, //Test Vector required to match against the Database. This
is TestVector base pointer + offset into the test vector
    Int st_size, //size of the structure in database
    Int vec_size, //size of the vector which needs to be matched
    SurfaceIndex *IT_ptr, //Index Table Base pointer
    Int DBoffset[LoadSize], //Array of offset into the database// DBoffset is an array
if Index Table is not used. Else it is a single element.
    // In case of direct mode, this represents the offset into the Database. In case of
    indirect addressing mode, this offset points into the Index Table. Either case there
    is only one DBoffset.
    Int st_Offset, //offset into the structure in DataBase to read the vectore in database
to be matched
    Int LoadSize, //size of the Data base which is to be loaded into the hardware fixed
function block
    Int Match_size, //Size of the Database loaded into the feature matching hardware
which needs to be matched with the test vector
    Int Index[Match_size], //List of local offset in the hardware where the data base is
loaded, which need to be matched with the test vector
    Int Mode, //DB access and distance metric
    Int *result // Points to the result of the matching. This is an array length of
Match_size, with each element containing the result of the distance metric per database.
This result is returned to the processing unit where the final K best matches are
determined.
    );
Where
    Mode.Element_size can be unsigned/signed byte/short/integer or Floating pointer
number or Bit (for bit vectors).
    If (Mode.DB != SCATTERED) Only DBOffset[0] is valid and rest of the entries
are not required to be populated. T he rest of the "LoadSize" entries are read from
consecutive entries starting from DBOffset[0]. Basically the next entry is got by
incrementing the structure by +1.
    If (Mode.DB == SCATTERED) then the "LoadSize" entries from the Database is
read based on the DBOffset[LoadSize]. Each entry can be pointing to any location in the
Database and can be scattered.
    If (Mode.TV !=SCATTERED) then the test vector will match against the database
loaded into the hardware (LoadSize determine the number of entries loaded in the
hardware Fixed function) starting from Index[0]. Index[0] should be in the range of 0 to
"LoadSize-1" and "(Index[0]+MatchSize) < LoadSize".  Consecutive entries of the
database which is loaded in the hardware fixed function will be accessed starting from
Index[0] for doing the feature matching.
    If (Mode.TV ==SCATTERED) then the test vector can be matched again any
MatchSize number of Data base vectors loaded in the hardware fixed function indexed
using Index[MatchSize]. They can be scattered in the internal buffer where the data base
is loaded and does not need to be assigned to consecutive locations in the buffer.
    Mode.Distance can take the following parameters :
        L1 norm : SAD based feature matching
        L2 norm : SSD based feature matching
```

-continued

HD : Hamming Distance
//though the above three distance metrics are disclosed for feature matching, the feature matching module is not limited to these metrics and can be arranged to perform other distance metrics.

An example of psuedo-code appropriate for enabling and practicing the system and method disclosed herein, as follows:

```
DATABASE_FETCH:
e_size = Mode.Element_size For(i=0; i < LoadSize; i++){
If(Mode.DB == SCATTER)
Fetch_addr = DB_ptr + DBOffset[i]*st_size + st_offset Else
Fetch_addr = DB_ptr + (DBOffset[0] + i)*st_size + st_offset
Read_vector(Fetch_addr, vec_size, e_size, DBBuffer[i]) //DBBuffer is the local
Buffer for DB vector in the feature matching hardware
}
Read_vector(TV_ptr, vec_size, e_size, TVBuffer) //TVBuffer is the local Buffer for
test vector in the feature matching hardware
FEATURE MATCHING:
For (j =0; j < MatchSize; j++){ If(MODE.TV == SCATTER)
LVector = DBBuffer[Index[j]]
Else
LVector = DBBuffer[Index[0]+j]
Result[j] = MatchDistance(LVector, TVBuffer, MODE.Distance, vec_size)
}
Return (Result)
Where
Read_vector(pointer, vec_size, e_size, local_buffer) { Local_buffer[vec_size*e_size] =
read(pointer, vec_size*e_size)
//vec_size*e_size is the amount of data in bytes read from memory
}
MatchDistance(LVector, TVBuffer, MODE.Distance, vec_size) { Result = 0
For(k=0; k < vec_size; k++){ If(Mode.Distance == L1Norm)
Result += ABSOLUTE(LVector[k] – TVBuffer[k]) Else if (Mode.Distance ==
L2Norm)
Result += ((LVector[k] – TVBuffer[k])^2) Else if (Mode.Distance == HD) //bit
vector
Result |= ((LVector[k] .XNOR. TVBuffer[k]) << k)
}
Return(Result);
}
//End Pseudo code
```

Figure 6:
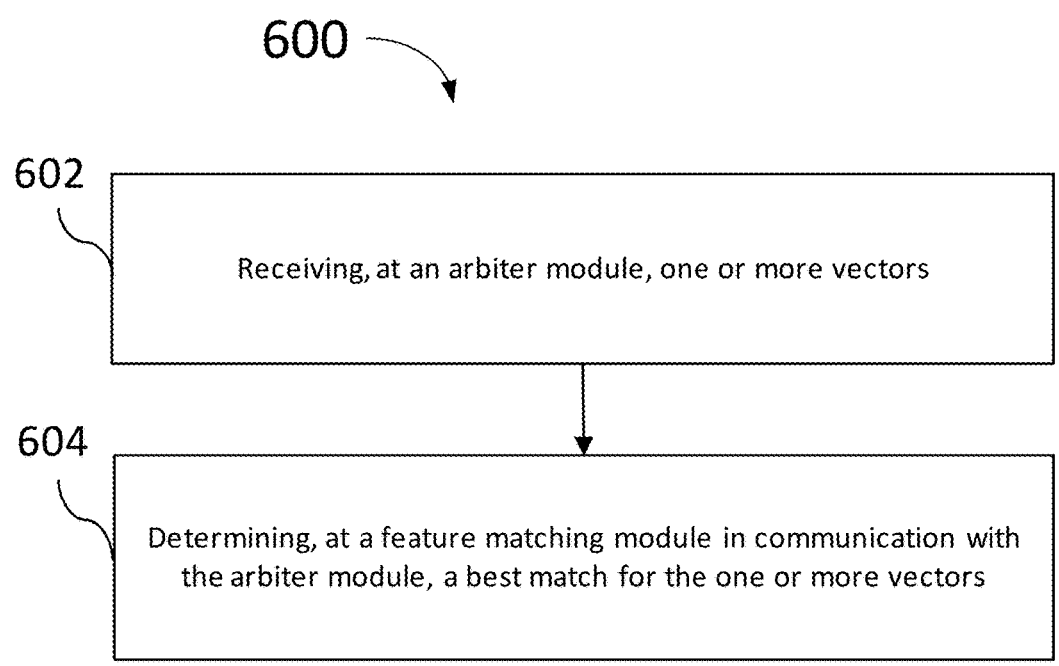
FIG. 6 is a flowchart of an example of a feature matching method in accordance with an embodiment of the present disclosure.

FIG. 6 shows an example of a feature matching method 600 in accordance with an embodiment of the present invention. The method 600 may be implemented in executable software as a set of logic instructions stored in a machine- or computer-readable storage medium of a memory such as random access memory (RAM), read-only memory (ROM), programmable ROM (PROM), firmware, flash memory, etc., in configurable logic such as, for example programmable logic arrays (PLAs), field programmable gate arrays (FPGAs), complex programmable logic devices (CPLDs), infix functionality logic hardware using circuit technology such as, for example, application-specific integrated circuits (ASIC), complementary metal oxide semiconductor (CMOS) or transistor-transistor logic (TTL) technology, or any combination thereof. For example, computer program code to carry out operations shown in method 600 may be written in any combination of one or more programming languages including an object-oriented programming language such as Java, Smalltalk, C++ or the like and conventional procedural programming languages, such as the "C" programming language or similar programming languages.

At 602, the method receives, at an arbiter module, one or more vectors. The one or more vectors may include criteria related to test vectors associated with captured images or objects. At 604, a determination is made, at a feature matching module in communication with the arbiter module, for a best match for the one more vectors. The best match may then be determined based on criteria related to database vectors associated with stored images or objects.

Illustrated processing block 602 may begin by initiating, from a processing element, a feature matching call to load a number of vectors from a database. In one example, the arbiter module determines whether the load is in a contiguous location(s) or scattered locations within the database vector storage module, and database pointers are programmed based on the load locations. Block 604 may begin by reading database vectors from the database vector storage module, and loading the database vectors to a memory, e.g., a buffer. A determination is made whether the database vectors are partial vectors. If not, the database vector results are loaded to the memory. If so, any remaining database vectors are loaded to memory. The test vectors may then be loaded to the memory. A best match is determined per test vector based on feature matching criteria between the database vectors and individual test vectors.

In use, the system 100, 200, 300 (FIGS. 1-3) may initiate a feature matching call from a processing element (PE) 100 (which can be a CPU, GPU, GPGPU, or other similar processing element) to load a "Loadsize" number of vectors from a database. The load can be in either contiguous or scattered locations. Database pointers are programmed according to the load locations. The size of the structure per database entry and the offset of the vector to be loaded within the structure are provided to read the vectors. In some instances, the actual vector size may be larger than the hardware can support. In these cases, partial vectors are loaded and partial results are computed for feature matching and returned to the processing element. Another call(s) can be made for the next partial result. Once all partial results are returned to the processing element, the best matches, e.g., K-best matches, are determined within the processing element per test vector.

For brute force matching and contiguous locations, both the MODE.DB and MODE.TV are set as NOT SCATTERED. A "LOADSIZE" number of vectors are loaded from the database. Either the full vector or part of the vector is loaded (depending on the capacity of the fixed function hardware), and the vector distance is computed. After all the partial distance metrics are computed, the processing element can select the desired best matches, e.g., K-best matches, per test vector. The fixed function hardware can be arranged, e.g., by design or programming, to determine which distance metric (L1norm, L2norm or HD) to be used.

While K-best matches are discussed here, the system is not limited to K-best matches. For example, the system could also use hierarchal K-means (HKM) of approximate nearest neighbor searches with the same hardware. Assuming the database is already trained and laid out for HKM, on the top level the database vectors which need to be searched are scattered in the database. However, the hardware can still be used by programming the MODE.DB as SCATTERED and giving the appropriate DBOffset locations that need to be loaded into the internal buffer of the feature matching hardware. Again, each test vector is compared against all loaded database vectors and the results are returned to the processing element in the same manner as with brute force matching.

Further down the hierarchy in HKM or in the case of locality-sensitive hashing (LSH), not all test vectors need to be matched with the same set of database vectors. In these cases, the vectors may be sorted in each step into buckets (where each bucket can have one or more database vectors). Based on the capacity of the hardware, i.e., LOADSIZE, the corresponding database vectors are loaded. When the test vector is sent to the hardware from the processing element for matching, the corresponding index into the local buffer is also sent along with the MatchSize per test vector. Both the MODE.DB and MODE.TV are set as SCATTERED. The corresponding database vectors using the index are chosen for matching with the test vector. The partial results are sent back to the processing element.

The present disclosure describes various embodiments of a feature matching system and method for use in object-recognition. The system and method, in at least one embodiment, determines various features of an object and determines what type of object the features correspond to. During a detection stage, the system detects objects within a database and extracts vectors based on unique features of the objects. The objects may be, for example, captured images, stored images, and the like. The vectors may be extracted by a variety of methods of detection familiar to those of ordinary skill in the art. The extracted vectors are stored in a database. During a matching phase, the extracted vectors are used to match against a database of objects of interest. The objects of interest may be determined by various methods including, for example, kernels that detect corners and edges within an image.

Features within the object may then be determined by various nearest neighbor matching methods including, for example, by extracting vectors that correspond to the corners and edges of the object. Smooth regions of objects contain very little information with respect to what the object corresponds to. Conversely, the corners tend to provide a wealth of information about the object and the edges provide additional details that further define the object. Therefore, vectors representing the corners and edges may be combined to provide greater detail that allows a feature point of the object to be defined within acceptable parameters. The extracted vectors may then be submitted to a database and matched to objects having vectors that correspond to the feature point. The system and method thereby provides a fast and efficient means of detecting objects.

There are various suitable techniques for detecting points of interest as known by those of ordinary skill in the art including, for example, edges and corners, and the like. Vectors may then be created to provide a representation of this feature point. Once the vectors have been created they are matched against a database in order to detect features within the object. Once the features have been detected, the matching is performed to match vectors that correspond to multiple objects. The vectors are then compared to find the nearest match within the database such that the actual object can be found.

The system and method are suitable for use with many computing applications including, for example, facial recognition, object recognition, and the like. There are various suitable methods for performing the matching including, for example, brute force matching, hierarchical matching, and other similar techniques.

The present disclosure, in at least one embodiment, provides a hardware accelerator that offers significant advantages over known software object matching solutions. The system and method provides a hardware object matching accelerator that offers flexibility for use with different object matching techniques. For example, the hardware can be configured and/or reconfigured with an appropriate software stack for use with various object matching algorithms including brute force matching, hierarchical matching, and the like.

Feature matching in object recognition techniques is often used for classification of objects. For example, the techniques may be used to identify an object as an automobile or a flower. The techniques may also be used to further identify the object by sub-classification. For example, the technique may be used to identify an automobile as a truck versus a car, or to identify a flower as a rose versus a tulip, sunflower, or some other flower.

In order to perform feature matching, the system and method uses an image of the object and creates vectors. The vectors can be of variable sizes depending on the feature matching technique used. The vectors may be set to a size suitable for use with the feature matching technique and associated algorithm. The vector size is typically fixed at a size such as, for example, 500 bits, 1000 bytes, and the like, depending on the algorithm. The vector size can have multiple elements. Each element can be a byte or a word that provides a descriptor element. The byte or deword can be an integer (i.e., positive or negative equally spaced points) or a float (i.e., floating point number). Therefore, in a vector created as a 64 bit vector there are 64 integers or floating point numbers (each providing a descriptor element) that create and define the vector. As discussed above, the vector can be of various sizes depending on the feature matching technique (and associated algorithm) used. Accordingly, once the algorithm is fixed, the vector size is fixed based on the algorithm. The element sized is then fixed based on the vector size.

Figure 7:
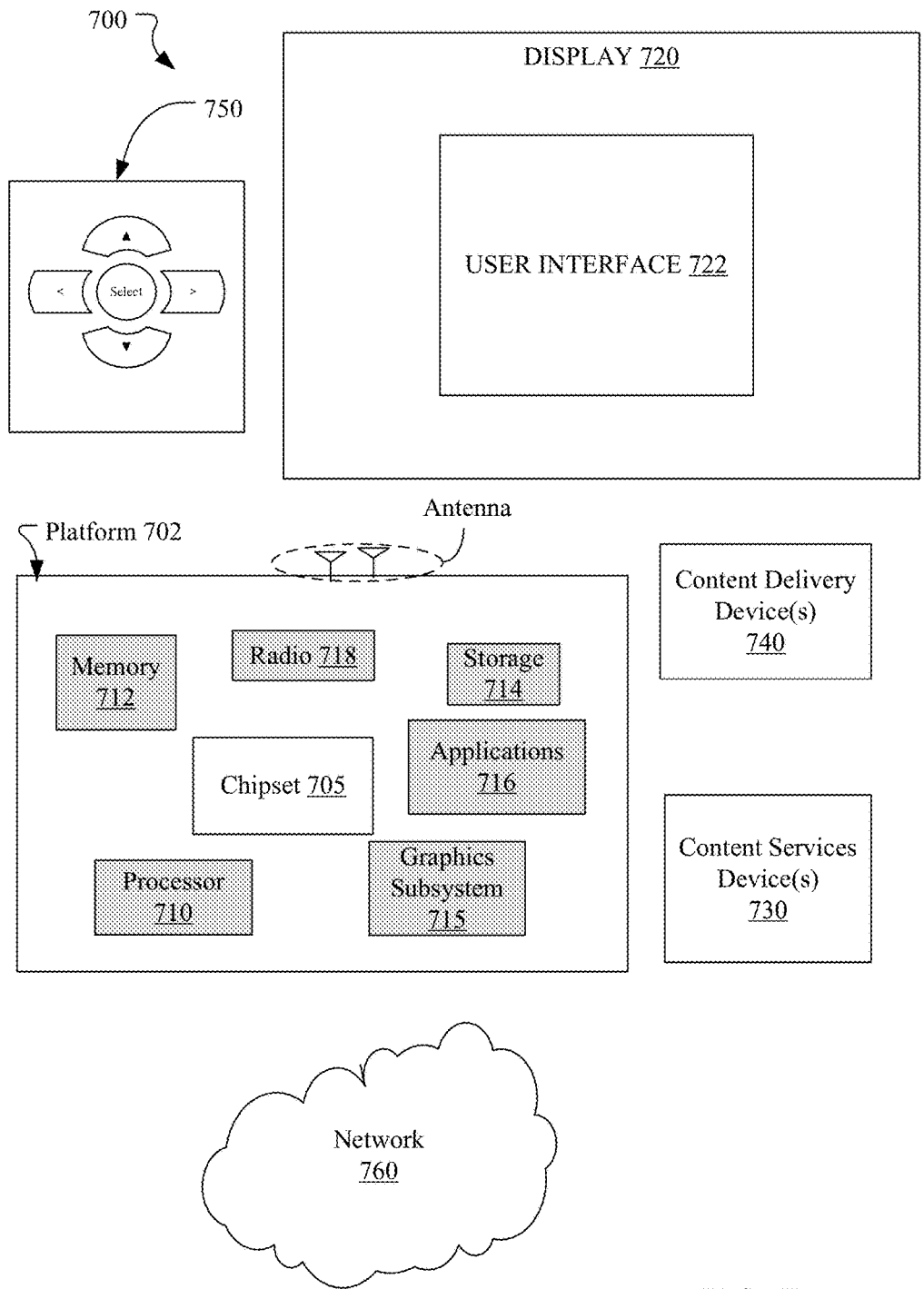
FIG. 7 is a block diagram of an example of a system having a navigation controller in accordance with an embodiment of the present disclosure.

FIG. 7 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth. Thus, the system 700 may be used to perform feature matching as described herein.

In embodiments, the system 700 comprises a platform 702 coupled to a display 720. Platform 702 may receive video bitstream content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. The graphics subsystem 715 may therefore include the graphics processor or processing element 110a-110n (FIG. 1), already discussed. In addition, the processor 710 may be configured to operate as a host processor via instructions obtained from the memory 712, the storage 714 or other suitable source. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the embodiments.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 7.

Figure 8:
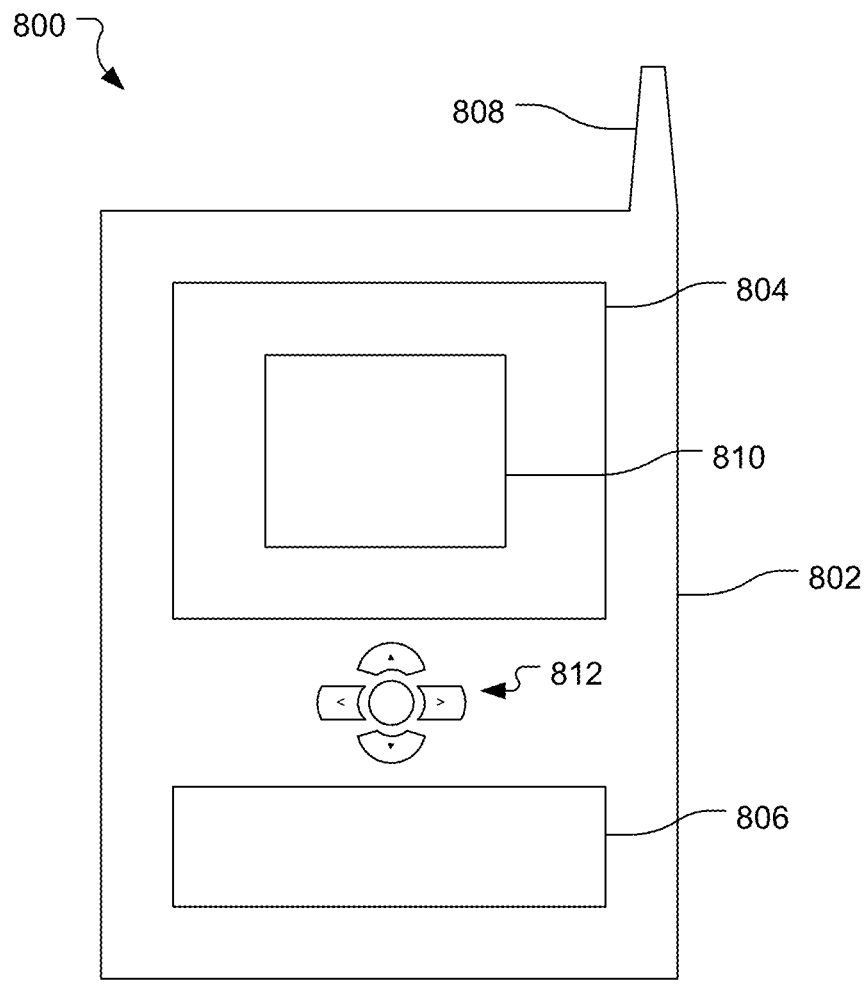
FIG. 8 shows is a block diagram of an example of a system having a small form factor in accordance with an embodiment of the present disclosure.

As described above, system 700 may be embodied in varying physical styles or form factors. FIG. 8 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 8, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

ADDITIONAL NOTES AND EXAMPLES

Example 1 may include a system for feature matching in objection recognition applications, having a host processor, a system memory associated with the host processor, a processing module in communication with the system memory, an arbiter module in communication with the processing module, and a feature matching module in communication with the arbiter module. The arbiter module may receive one or more vectors from the processing module. The feature matching module may determine a best match for the one or more vectors.

Example 2 may include the system of example 1, wherein the arbiter module is to reorder the one or more vectors into test vectors and database vectors.

Example 3 may include the system of examples 1 or 2, wherein the feature matching module further includes a database vector memory module, and a test vector memory module.

Example 4 may include the system of examples 1 to 3, wherein the database vector memory module is to receive database vector fetch requests from the arbiter module.

Example 5 may include the system of examples 1 to 3, wherein test vector memory module is to receive test vector fetch requests from the arbiter module.

Example 6 may include the system of example 1, wherein the processing module includes one or more processing elements that initiate a feature matching call for the one or more vectors.

Example 7 may include a method of feature matching that involves receiving, at an arbiter module, one or more vectors, and determining, at a feature matching module in communication with the arbiter module, a best match for the one or more vectors. The feature matching module may be in communication with the arbiter module.

Example 8 may include the method of example 7, further including reordering, at the arbiter module, the one or more vectors.

Example 9 may include the method of examples 7 or 8, wherein the one or more vectors are reordered into test vectors and database vectors.

Example 10 may include the method of examples 7 or 8, further including receiving, at a database vector memory module, database vector fetch requests from the arbiter module, and receiving, at a test vector memory module, test vector fetch requests from the arbiter module.

Example 11 may include the method of example 7, further including initiating, at a processing module, a feature matching call for the one or more vectors.

Example 12 may include the method of examples 7 to 11, wherein the processing module includes one or more processing elements.

Example 13 may include an apparatus to perform feature matching, having an arbiter module in communication with a processing module, and a feature matching module in communication with the arbiter module. The arbiter module to receive one or more vectors. The feature matching module to determine a best match for the one or more vectors.

Example 14 may include the apparatus of example 13, wherein the arbiter module reorders the one or more vectors into test vectors and database vectors.

Example 15 may include the apparatus of examples 13 or 14, wherein the feature matching module further includes a database vector memory module, and a test vector memory module.

Example 16 may include the apparatus of example 13 to 15, wherein the database vector memory module is to receive database vector fetch requests from the arbiter.

Example 17 may include the apparatus of examples 13 to 15, wherein the test vector memory module is to receive test vector fetch requests from the arbiter module.

Example 18 may include the apparatus of examples 13 to 17, wherein the processing module includes one or more processing elements that initiate a feature matching call for the one or more vectors.

Example 19 may include at least one computer readable storage medium having an application or workload which, if executed on a host processor, issues commands to a processing unit. The application, if executed, may also cause commands to be dispatched to the processing unit which may receive, at an arbiter module, one or more vectors. The processing unit may determine, at a feature matching module in communication with the arbiter module, the best match for the one or more vectors.

Example 20 may include at least one computer readable storage medium of example 19, wherein the instructions, if executed, further cause the processor to issue commands to reorder, at the arbiter module, the one or more vectors into test vectors and database vectors.

Example 21 may include at least one computer readable storage medium of examples 19 or 20, wherein the instructions, if executed, further cause the processor to issue commands to receive, at a database vector memory module, database vector fetch requests from the arbiter module, and to receive, at a test vector memory module, test vector fetch requests from the arbiter module.

Example 22 may include at least one computer readable storage medium of examples 19 to 21, wherein the instructions, if executed, further cause the processor to issue commands to initiate, at a processing module, a feature matching call for the one or more vectors.

Example 23 may include at least one computer readable storage medium of examples 19 to 22, wherein the processing module includes one or more processing elements.

Example 24 may include a system comprising means for performing the method of any of Examples 7 to 12.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments of this have been described in connection with particular examples thereof, the true scope of the embodiments should not be so limited since other modifications will become apparent to the skilled practitioner upon a study of the drawings, specification, and following claims.

I claim:

1. A system comprising:
a host processor;
a system memory associated with the host processor;
a processing module in communication with the system memory, wherein the processing module includes one or more processing elements that are to initiate a feature matching call for one or more test vectors;
an arbiter module in communication with the processing module, the arbiter module to receive the one or more test vectors from the one or more processing elements; and
a feature matching module in communication with the arbiter module, the feature matching module to utilize a plurality of feature matching applications to determine a best match for the one or more test vectors with one or more database vectors using a scattering mode and a non-scattering mode, wherein the non-scatter mode computes a next database offset by incrementing a pointer starting from a first database offset, wherein the scatter mode uses a database offset stored in an index table in consecutive locations to indirectly address into a database and read different addresses, and wherein only one offset element is used for both the non-scatter mode next database offset and the scatter mode database offset.

2. The system of claim 1, wherein the arbiter module is to reorder the one or more database vector fetch requests across the one or more test vectors using the same database vectors for matching.

3. The system of claim 2, wherein the feature matching module further comprises:
a database vector memory module, and
a test vector memory module.

4. The system of claim 3, wherein the database vector memory module is to receive the one or more database vector fetch requests from the arbiter module.

5. The system of claim 3, wherein the test vector memory module is to receive one or more test vector fetch requests from the arbiter module.

6. A method comprising:
receiving, at an arbiter module, one or more test vectors from a processing module having one or more processing elements; and
determining, at a feature matching module in communication with the arbiter module, a best match for the one or more test vectors with one or more database vectors using a scattering mode and a non-scattering mode, wherein the feature matching module utilizes a plurality of feature matching applications, wherein the non-scatter mode computes a next database offset by incrementing a pointer starting from a first database offset, wherein the scatter mode uses a database offset stored in an index table in consecutive locations to indirectly address into a database and read different addresses, and wherein only one offset element is used for both the non-scatter mode next database offset and the scatter mode database offset.

7. The method of claim 6, further comprising:
reordering, at the arbiter module, the one or more database vector fetch requests across the one or more test vectors using the same database vectors for matching.

8. The method of claim 7, further comprising:
receiving, at a database vector memory module, the one or more database vector fetch requests from the arbiter module; and
receiving, at a test vector memory module, one or more test vector fetch requests from the arbiter module.

9. The method of claim 6, further comprising:
initiating, at a processing module, a feature matching call for the one or more test vectors.

10. An apparatus comprising:
an arbiter module, implemented at least partly in one or more of configurable logic or fixed functionality logic hardware, in communication with a processing module, implemented at least partly in one or more of configurable logic or fixed functionality logic hardware, the arbiter module to receive one or more test vectors from one or more processing elements of the processing module; and,
a feature matching module, implemented at least partly in one or more of configurable logic or fixed functionality logic hardware, in communication with the arbiter module, the feature matching module to utilize a plurality of feature matching applications to determine a best match for the one or more test vectors with one or more database vectors using a scattering mode and a non-scattering mode, wherein the non-scatter mode computes a next database offset by incrementing a pointer starting from a first database offset, wherein the scatter mode uses a database offset stored in an index table in consecutive locations to indirectly address into a database and read different addresses, and wherein only one offset element is used for both the non-scatter mode next database offset and the scatter mode database offset.

11. The apparatus of claim 10, wherein the arbiter module is to reorder the one or more database vector fetch requests across the one or more test vectors using the same database vectors for matching.

12. The apparatus of claim 11, wherein the feature matching module further comprises:
a database vector memory module, and
a test vector memory module.

13. The apparatus of claim 10, wherein the database vector memory module is to receive the one or more database vector fetch requests from the arbiter.

14. The apparatus of claim 10, wherein the test vector memory module is to receive one or more test vector fetch requests from the arbiter module.

15. The apparatus of claim 10, wherein the one or more processing elements initiate a feature matching call for the one or more test vectors.

16. At least one non-transitory computer readable storage medium comprising a set of instructions which, if executed by a processor, cause a computer to:
receive, at an arbiter module, implemented at least partly in one or more of configurable logic or fixed functionality logic hardware, one or more test vectors from a processing module having one or more processing elements; and
determine, at a feature matching module, implemented at least partly in one or more of configurable logic or fixed functionality logic hardware, in communication with the arbiter module, a best match for the one or more test vectors with one or more database vectors using a scattering mode and a non-scattering mode, wherein the feature matching module is to utilize a plurality of feature matching applications, wherein the non-scatter mode computes a next database offset by incrementing a pointer starting from a first database offset, wherein the scatter mode uses a database offset stored in an index table in consecutive locations to indirectly address into a database and read different addresses, and wherein only one offset element is used for both the non-scatter mode next database offset and the scatter mode database offset.

17. The at least one computer readable storage medium of claim 16, wherein the set of instructions, if executed by the processor, further cause the processor to:
reorder, at the arbiter module, the one or more database vector fetch requests across the one or more test vectors using the same database vectors for matching.

18. The at least one computer readable storage medium of claim 16, wherein the instructions, if executed, further cause the processor to:
receive, at a database vector memory module, the one or more database vector fetch requests from the arbiter module; and
receive, at a test vector memory module, one or more test vector fetch requests from the arbiter module.

19. The at least one computer readable storage medium of claim 16, wherein the instructions, if executed, further cause the processor to:
   initiate, at a processing module, a feature matching call for the one or more test vectors.

* * * * *